United States Patent
Ries et al.

(10) Patent No.: US 11,747,159 B2
(45) Date of Patent: Sep. 5, 2023

(54) METHOD FOR LANDMARK-BASED LOCALISATION OF A VEHICLE

(71) Applicant: MERCEDES-BENZ GROUP AG, Stuttgart (DE)

(72) Inventors: Florian Ries, Stuttgart (DE); Yinglai Yang, Sindelfingen (DE); Frank Schuster, Böblingen (DE); Martin Haueis, Gärtringen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/915,641

(22) PCT Filed: Feb. 19, 2021

(86) PCT No.: PCT/EP2021/054204
§ 371 (c)(1),
(2) Date: Sep. 29, 2022

(87) PCT Pub. No.: WO2021/197710
PCT Pub. Date: Oct. 7, 2021

(65) Prior Publication Data
US 2023/0115520 A1 Apr. 13, 2023

(30) Foreign Application Priority Data
Mar. 31, 2020 (DE) ...................... 10 2020 108 907.4

(51) Int. Cl.
*G01C 21/36* (2006.01)
*G01C 21/00* (2006.01)
(52) U.S. Cl.
CPC ..... *G01C 21/3644* (2013.01); *G01C 21/3874* (2020.08)

(58) Field of Classification Search
CPC ........... G01C 21/3644; G01C 21/3874; G01C 21/1656; G01C 21/3602; G01C 21/30; G01C 21/3811
See application file for complete search history.

(56) References Cited

U.S. PATENT DOCUMENTS

| | | | |
|---|---|---|---|
| 9,919,716 B2 * | 3/2018 | Christensen | ......... G06V 20/588 |
| 2011/0118979 A1 * | 5/2011 | Mao | ..................... G01C 21/005 |
| | | | 701/532 |

(Continued)

FOREIGN PATENT DOCUMENTS

| DE | 102019000492 A1 | 6/2019 |
|---|---|---|
| DE | 102018004229 A1 | 11/2019 |

(Continued)

OTHER PUBLICATIONS

International Search Report dated May 26, 2021 in related/corresponding International Application No. PCT/EP2021/054204.

(Continued)

*Primary Examiner* — Rami Khatib
(74) *Attorney, Agent, or Firm* — PATENT PORTFOLIO BUILDERS PLLC (57) ABSTRACT

A method for landmark-based localization of a vehicle involves forming a plurality of position hypotheses for a vehicle position based on a forming of associations between sensor landmark objects detected by sensor and map landmark objects stored in a digital map. A most likely vehicle position is ascertained as the localization result on the basis of a probabilistic filtering of the position hypotheses, and a guaranteed position area is ascertained, in which a predefined error upper limit is not exceeded. This is performed several times with different set-ups of the probabilistic filtering. The localization result with the smallest guaranteed (Continued)

position area is selected as vehicle position if the guaranteed position areas overlap fully in pairs.

10 Claims, 2 Drawing Sheets

(56) References Cited

U.S. PATENT DOCUMENTS

| | | | |
|---|---|---|---|
| 2015/0378015 A1* | 12/2015 | You | G01S 13/06 |
| | | | 701/469 |
| 2020/0124421 A1* | 4/2020 | Kang | G01S 17/06 |
| 2021/0215503 A1* | 7/2021 | Ries | G01C 21/3844 |
| 2021/0278220 A1 | 9/2021 | Ries et al. | |
| 2022/0221278 A1 | 7/2022 | Ries et al. | |

FOREIGN PATENT DOCUMENTS

| | | |
|---|---|---|
| DE | 102019003246 A1 | 11/2020 |
| WO | 2019243031 A1 | 12/2019 |

OTHER PUBLICATIONS

Office Action created Nov. 18, 2021 in related/corresponding DE Application No. 10 2020 108 907.4.
Written Opinion dated May 26, 2021 in related/corresponding International Application No. PCT/EP2021/054204.

* cited by examiner

METHOD FOR LANDMARK-BASED LOCALISATION OF A VEHICLE

BACKGROUND AND SUMMARY OF THE INVENTION

The invention relates to a method for landmark-based localization of a vehicle.

A method for determining the position of a vehicle is known from the prior art, as described in WO 2019/243031 A1. By means of a comparison of landmark objects detected by means of a sensor system of the vehicle with landmark objects stored in a map, in particular in a map detail, a plurality of position hypotheses are ascertained. By analyzing all position hypotheses and filtering out all false information by means of a probabilistic analysis, a position hypothesis with an integrity value is ascertained. By means of a filtering according to predefined limit values, a position hypothesis having a position accuracy sufficient in a specified way is ascertained for the position determination.

Exemplary embodiments of the invention are directed to a method for landmark-based localization of a vehicle that is improved compared to the prior art.

In a method for landmark-based localization of a vehicle, a plurality of position hypotheses for a vehicle position are formed in one method section based on a forming of associations between sensor landmark objects detected by sensor, in particular by means of an environment detection sensor system of the vehicle, and map landmark objects stored in a digital map, and, likewise in this method section, a most likely vehicle position is ascertained as the localization result based on a probabilistic filtering of the position hypotheses, and a guaranteed position area, also referred to as a protection limit, is ascertained, in which a predefined error upper limit is not exceeded. The protection limit, i.e., the guaranteed position area, is thus a position area in which a specific maximum error rate is guaranteed, i.e., in which it is guaranteed that a specific, i.e., the predefined, error upper limit is not exceeded. This specific, in particular guaranteed, maximum error rate is an error upper limit, for example $10^{-3}$ errors per hour, which is guaranteed for the guaranteed position area (protection limit), i.e., within the guaranteed position area (protection limit) the error rate of the localization result is lower than the guaranteed maximum error rate.

In accordance with the invention, this method section, at least the part of the method section in which, based on the probabilistic filtering of the position hypotheses, the most likely vehicle position is ascertained as the localization result and the guaranteed position area is ascertained, in which the predefined error upper limit is not exceeded, is performed several times, for example at least twice, for example at least three times, for example precisely three times, with different set-ups of the probabilistic filtering, in particular with different set-ups of a feature association filter, which in particular is probabilistic. The result of this is a plurality of localization results with different accuracies and different guaranteed position areas. If the guaranteed position areas overlap fully in pairs, i.e., in particular if this is the case for each possible pairing of the guaranteed position areas ascertained in the various embodiments of this method step, the localization result with the smallest guaranteed position area is then selected as vehicle position, i.e., as the sought vehicle position to be ascertained by means of the method.

The different set-ups of the probabilistic filtering relate, in particular, to the feature association filter, in particular exclusively the feature association feature. The position hypotheses are filtered in this feature association filter, and improbable position hypotheses are discarded. Due to the different set-ups of this feature association filter, the probabilities of the position hypotheses are thus evaluated differently in the various embodiments of this method section or at least the above-described part of the method section, so that the position hypotheses are correspondingly evaluated as other than probable or improbable, i.e., the position hypothesis in question can be evaluated as probable by one set-up of the feature association filter and can be evaluated as improbable and discarded by the other set-up. The various embodiments of the method section or at least of the above-described part of the method section thus result in different numbers of position hypotheses and/or different position hypotheses, in particular on the one hand only a few, but very reliable position hypotheses, in particular with a strict set-up of the feature association filter, and on the other hand many, but less reliable position hypotheses, in particular with a less strict set-up of the feature association filter.

The method is performed in particular in the vehicle, in particular by the vehicle, in particular by at least one unit of the vehicle, the unit being provided for this purpose and formed and configured accordingly. The digital map or at least one map detail of the digital map used for the method is in particular stored in the vehicle, in particular in the unit provided for carrying out the method, or in a further unit of the vehicle coupled to said unit, in particular coupled for data transfer.

The method is particularly advantageous for vehicles having partly automated, in particular highly automated, or autonomous driving systems. Requirements on such driving systems are often that the localization identifies the integrity of a currently output vehicle position. This is constituted by the calculation and output of the guaranteed position areas, i.e., of the protection limits, which indicate what maximum deviation from the actual position can actually be guaranteed with a residual error rate defined for this, however, these must generally only apply from a specific threshold value. This threshold value is also referred to as an alert limit. This alert limit is thus a threshold value that is required for a specific application, for example with driverless driving, in particular for partly automated, in particular highly automated, or autonomous driving, for the guaranteed position area (protection limit). In this case, the various safety objectives of the system set-up of such driving systems often have different integrity requirements. This requires the output of a plurality of guaranteed position areas (protection limits) with different threshold values and residual error rated accepted for this.

In the solution according to the invention, a plurality of so-called shadow instances of a localization filter formed in particular as a probabilistic filter, for example a Kalman filter, are applied and are arranged downstream of false association filters, in particular feature association filters, configured with different stringency. The vehicle positions are estimated independently of one another, wherein the stricter shadow instances have more integral states, but also achieve a lower accuracy. The guaranteed position areas (protection limits) are thus in turn more reliable, i.e., there is rarely a false-positive statement that the guaranteed position area (protection limit) is smaller than the threshold value (alert limit), although this is not actually the case, and the guaranteed position areas (protection limits) are thus also larger, however, whereby the condition that the guaranteed position area (protection limit) is smaller than the threshold value (alert limit) is rarely satisfied. Less strict shadow instances deliver a more accurate position since more information is included. This is utilized optimally by the solution according to the invention, since the most accurate vehicle position, which still lies within all guaranteed position areas (protection limits) is output as the ultimate vehicle position, i.e., as the sought vehicle position that is to be ascertained by means of the method.

By way of the solution according to the invention and the resultant ascertainment of a plurality of guaranteed position areas (protection limits), it is furthermore made possible to output a plurality of guaranteed position areas (protection limits), which serve different safety objectives optimally, for example a road accuracy for activation of a highly automated driving function, for which purpose a large threshold value (high alert limit) with a low acceptable error rate is necessary, and parallel thereto a lane accuracy for an automated lane change, for which purpose a very low threshold value (very low alert limit) with a higher accepted error rate is necessary. The availability of the overall system, i.e., in particular the partly automated, in particular highly automated or autonomous driving system of the vehicle, thus increases. The safety requirements additionally no longer impair the accuracy of the vehicle position, since in the solution according to the invention there is advantageously also a shadow instance, which operates with the greatest possible feature density. It is nevertheless monitored by the more reliable instances, whereby greater errors are intercepted.

In a possible embodiment of the method, if at least one pair of the guaranteed position areas is provided that overlap only in part, i.e., if the guaranteed position areas do not all overlap fully in pairs, an error message is then output. In particular, malfunctions of the partly automated, in particular highly automated, or autonomous driving systems of the vehicle and in particular possible risks resulting from an incorrect or imprecise localization are thus avoided. In this case, for example, the partly automated, in particular highly automated, or autonomous driving system of the vehicle or at least a corresponding driving function of this driving system is deactivated and for example a vehicle driver is requested to take over driving of the vehicle and/or for example the vehicle is stopped, in particular in a safe position.

In a possible embodiment, the selected vehicle position is assigned to all larger guaranteed position areas. These guaranteed position areas together with the selected vehicle position can thus be used for example, as already described above, for a plurality of different safety objectives, and serve these optimally in each case.

The above-described plurality of embodiments of the method section, at least of the above-described part of the method section, are advantageously carried out temporally in parallel, in particular are advantageously started at the same time. The above-described plurality of embodiments of the method section, at least of the above-described part of the method section, are advantageously performed in parallel branches, in particular in branches running temporally in parallel. The various localization results and guaranteed position areas are thus ready advantageously at the same time for further processing. In particular, in comparison to an embodiment with successive execution, a much quicker processing time is thus achieved. This is of great importance for a continuous, most accurate possible localization of the moving vehicle. Due to the rapid processing, higher vehicle speeds, for example, can thus also be made possible in the partly automated, in particular highly automated or autonomous driving operation.

In a possible embodiment of the method, the branches of the method each comprise a feature association filter, wherein the feature association filters of the branches are configured differently, and wherein reliable position hypotheses are ascertained by means of the feature association filters of the branches. The different set-up of the filtering thus relates to the feature association filter of the different branches. The plurality of localization results then also result from this, with different accuracies and different guaranteed position areas.

In a possible embodiment of the method, the reliable position hypotheses of this branch and in particular an inherent movement of the vehicle are processed in the relevant branch by means of a probabilistic filter, in particular by means of a Kalman filter, and the corresponding localization result and the corresponding guaranteed position area, in which the predefined error upper limit is not exceeded, are thus ascertained. Since the reliable position hypotheses ascertained here by means of the differently set-up feature association filters and differing from one another as a result are used, different localization results and different guaranteed position areas, in which the specified error upper limit is not exceeded, are thus ascertained.

In a possible embodiment of the method, sensor landmark objects already passed by the vehicle are used for the forming of the associations between the sensor landmark objects detected by the sensor and the map landmark objects stored in the digital map. Sensor landmark objects detected by the sensor over a predefined time period and/or over a predefined route length are advantageously used for the forming of the associations between the sensor landmark objects detected by sensor and the map landmark objects stored in the digital map. The association is thus performed advantageously via a history of sensor landmark objects, the history also having been written and also being referred to as a signature. A greater accuracy of the vehicle position is thus advantageously achieved.

BRIEF DESCRIPTION OF THE DRAWING FIGURES

Exemplary embodiments of the invention will be explained in greater detail hereinafter with reference to drawings.

In the drawings.

Parts corresponding to one another are provided with the same reference signs in all figures.

DETAILED DESCRIPTION

Figure 1:
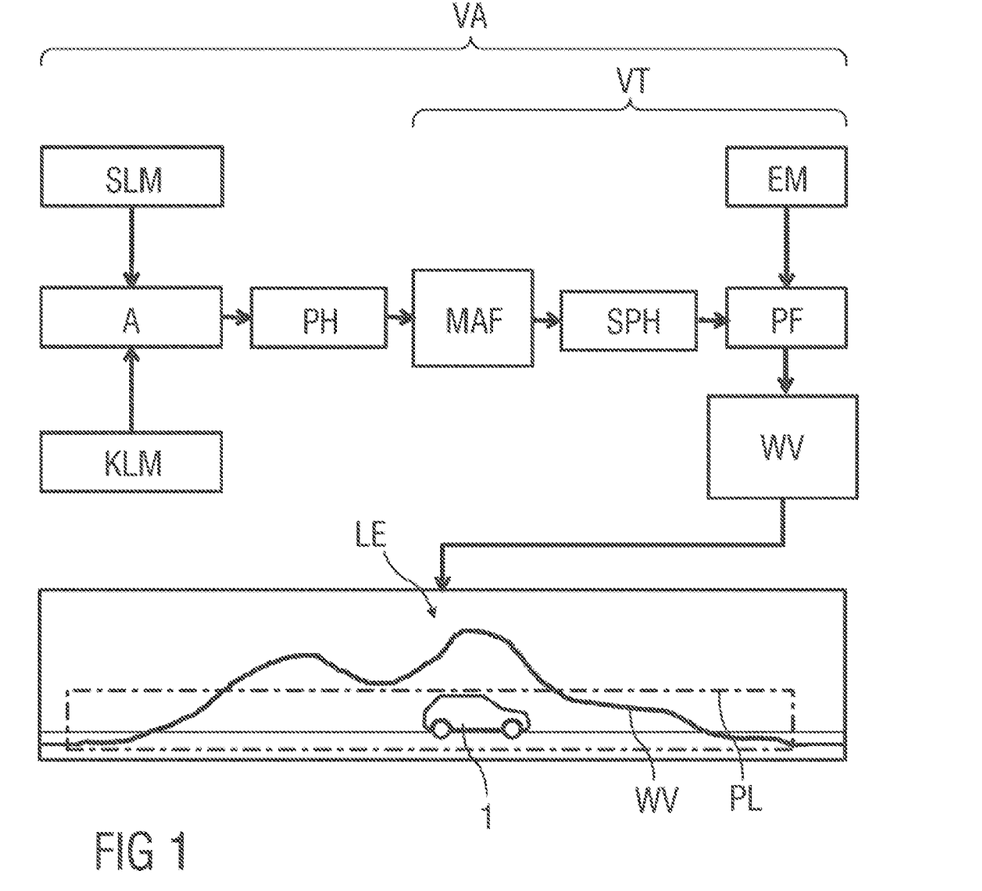
FIG. 1 shows schematically an embodiment of a method for landmark-based localization of a vehicle.
Figure 2:
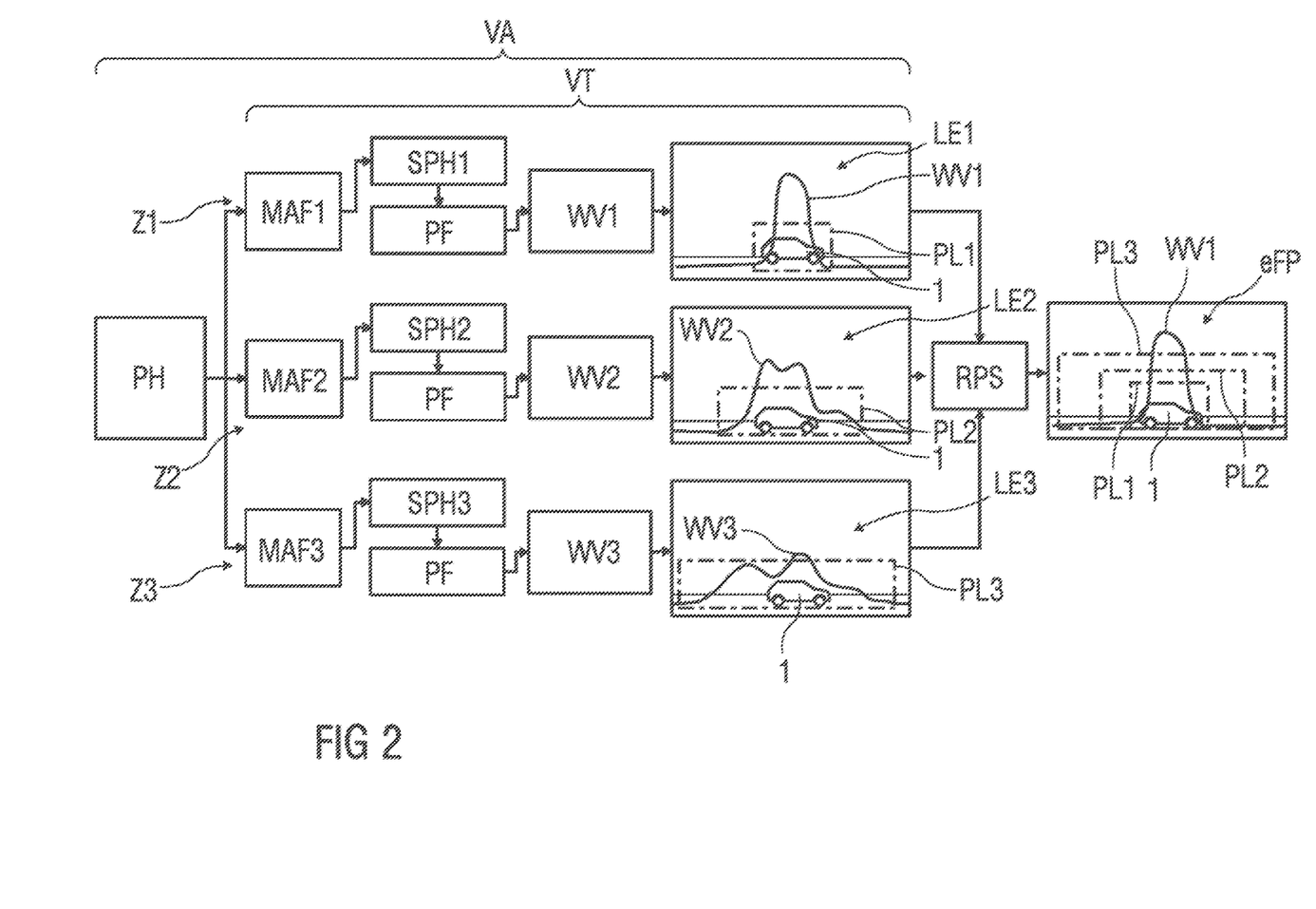
FIG. 2 shows schematically an improved further embodiment of a method for landmark-based localization of a vehicle.

FIGS. 1 and 2 show two embodiments of a method for landmark-based localization of a vehicle 1, wherein FIG. 1 shows an embodiment that is already known from the prior art and which is described, in particular, in WO 2019/243031 A1 in the name of the applicant. The content of that document WO 2019/243031 A1, in particular the content of its figures and the associated figure description, i.e., the content of FIGS. 1 to 12 and the figure description according to page 4 to page 14, which describe this embodiment of the method for landmark-based localization of a vehicle 1, is hereby incorporated by reference.

FIG. 2 shows, as will be described in greater detail hereinafter, a significantly improved embodiment of the method for landmark-based localization of a vehicle 1.

In both embodiments of the method, a plurality of position hypotheses PH for a vehicle position are formed based on forming of associations A between sensor landmark objects SLM detected by a sensor, in particular by means of an environment detection sensor system of the vehicle 1, and map landmark objects KLM stored in a digital map. Based on a probabilistic filtering of the position hypotheses PH, a most probable vehicle position is ascertained as localization result, and a guaranteed position area PL, also referred to as the protection limit, in which a predefined error upper limit is not exceeded, is ascertained.

This is shown schematically in FIG. 1. As described, associations A are formed between the sensor landmark objects SLM detected by sensor and the map landmark objects KLM stored in the digital map, in order to thus ascertain the plurality of position hypotheses PH for the vehicle position. The, in particular probabilistic, filtering or at least part of this, in particular probabilistic, filtering of these position hypotheses PH is performed by means of a features association filter MAF, which is formed in particular as a probabilistic filter. In particular, false associations A between the sensor landmark objects SLM detected by the sensor and the map landmark objects KLM stored in the digital map are filtered out in this feature association filter MAF, in order to thus observe the predefined error upper limit. In this way, reliable position hypotheses SPH are ascertained. These reliable position hypotheses SPH and an inherent movement EM of the vehicle 1, ascertained by means of an appropriate sensor system, in particular an odometry sensor system, are processed in a probabilistic filter PF, for example in a Kalman filter. The result is a probability distribution WV of the vehicle position in the digital map. The guaranteed position area PL can then be ascertained from this.

A guaranteed position area PL of the vehicle 1 is thus ascertained with a guaranteed error rate. The guaranteed position area PL is a position area in which it is guaranteed that the error rate of the localization does not exceed a predefined maximum permissible error rate, i.e., the predefined error upper limit. This guaranteed position area PL is also referred to, as already mentioned, as the protection limit.

The probability distribution WV of the vehicle position in the digital map is furthermore ascertained. The ascertainment of the probability distribution WV and the guaranteed position area PL is based here, as already mentioned, on the forming of associations A between the sensor landmark objects SLM detected by the sensor and the map landmark objects KLM stored in the digital map, on the creation of a plurality of position hypotheses PH based on the associations A as potential vehicle positions, and on the probabilistic filtering of the position hypotheses PH, in which improbable position hypotheses PH are faded out, i.e. filtered out and thus discarded, and therefore only the remaining reliable position hypotheses SPH are further processed. This probabilistic filtering is based here on a probabilistic evaluation of whether the individual position hypotheses PH are based more likely on correct associations A or on false associations, and on the filtering out of the position hypotheses PH based more likely on false associations.

The probabilistic evaluation is in turn based on a probabilistic analysis by means of the feature association filter MAF. Here, the position hypotheses PH are advantageously each evaluated with a distribution model for misleading information and with a distribution model for correct information. It is ascertained here how well a position hypothesis PH matches the distribution model for correct information and the distribution model for misleading information. This evaluation is based, in particular, on the idea that position hypotheses PH that are distributed in such a way that they accumulate in spatial proximity are based on correct associations A between the sensor landmark objects SLM detected by sensor and the map landmark objects KLM stored in the digital map, i.e., on correct information, and that position hypotheses PH for which this is not the case are based on incorrect associations A between the sensor landmark objects SLM detected by sensor and the map landmark objects KLM stored in the digital map, i.e., on misleading information.

The result is a value, also called an integrity value, which indicates whether the particular position hypothesis PH is more likely to be based on correct information or on misleading information. The value thus indicates the extent to which it is more probable that the particular position hypothesis PH is based on correct associations A than on false associations. By filtering out the position hypotheses PH according to this value, position hypotheses PH that are more likely based on false associations than on correct associations A are faded out, i.e., filtered out and thus discarded.

The problem with this approach according to the first embodiment of the method shown in FIG. 1 is that, on the one hand, not all false hypotheses, i.e., not all position hypotheses PH that are based on false associations, are faded out during the filtering, i.e., not all of these false hypotheses are filtered out, and on the other hand, a proportion of the correct position hypotheses PH, i.e., the position hypotheses PH that are based on correct associations A, are also faded out, i.e., filtered out. The reason for this is that, due to the probabilistic analysis, it is only possible to distinguish between false hypotheses and correct position hypotheses PH according to probability. Different degrees of fading out, i.e., filtering out, of false hypotheses and correct position hypotheses PH are thus obtained for different set-ups of the filtering.

Strict filtering thus leads to a strong suppression of false hypotheses, i.e., a false-positive rate (FPR) is reduced, but it also leads to a suppression of correct position hypotheses (PH). This suppression of correct position hypotheses PH leads to a low localization accuracy and thus to a larger guaranteed position area PL (protection limit). A strict set-up of the filter, in particular of the feature association filter MAF, thus leads to a low guaranteed error rate and to a low localization accuracy, in particular due to a wide guaranteed position area PL (protection limit).

By contrast, a less strict set-up of the filter, especially the feature association filter MAF, leads to a higher guaranteed error rate (i.e., more errors must be expected, thus more errors may occur in the localization) and to a higher localization accuracy, especially due to a narrower guaranteed position area PL (protection limit).

The size of the guaranteed position area PL (protection limit) and the guaranteed maximum error rate are thus determined by the set-up of the filter, in particular the feature association filter MAF. This is illustrated by the different probability distributions WV1, WV2, WV3 and the associated different guaranteed position areas PL1, PL2, PL3 (protection limit) shown in FIG. 2. The method sequence of this improved second embodiment of the method shown in FIG. 2, which results in these different probability distributions WV1, WV2, WV3 and guaranteed position areas PL1, PL2, PL3 (protection limit), will be explained hereinafter in detail.

If a guaranteed maximum error rate is allowed to be high, it can be guaranteed that the vehicle 1 is in a narrow range. The box around vehicle 1, i.e., around its vehicle position, shows the guaranteed position area PL1, PL2, PL3 (protection limit). The narrower this box, i.e., the guaranteed position area PL1, PL2, PL3, the more accurate the localization result LE1, LE2, LE3. The curve shows the corresponding probability distribution WV1, WV2, WV3, in particular a probability histogram, of the position hypotheses PH, in particular the reliable position hypotheses SPH1, SPH2, SPH3. The maximum of the probability distribution WV1, WV2, WV3 represents the most probable vehicle position. This maximum or the entire probability distribution WV1, WV2, WV3 represents the localization result LE1, LE2, LE3.

The upper box, i.e., the first guaranteed position area PL1, is narrow, but the guaranteed maximum error rate is high. By comparison, the lower box, i.e., the third guaranteed position area PL3, is wider, but the guaranteed maximum error rate is lower.

This means that the more precisely a vehicle position eFP is ascertained and thus the narrower the box indicating the guaranteed position area PL1, PL2, PL3, the more uncertain the ascertained vehicle position eFP, because the higher the guaranteed maximum error rate.

This relationship is used for the substantially improved second embodiment of the method, shown by way of example in FIG. 2, in that the known first embodiment of the method, shown in FIG. 1, in particular the part of the method designated in FIG. 1 by the reference sign VT, is carried out several times, in particular temporally in parallel, in each case with different set-ups of the filtering, in the example shown in FIG. 2 three times.

It can thus be provided that the forming of the associations A between the sensor landmark objects SLM detected by the sensor and the map landmark objects KLM stored in the digital map, in order to thereby ascertain the plurality of position hypotheses PH for the vehicle position, takes place only once. These ascertained position hypotheses PH are then probabilistically filtered in the manner described above, but in this improved second embodiment in a plurality of, in particular parallel, in particular temporally parallel, branches Z1, Z2, Z3 of the method with different set-ups of the filtering.

In each branch Z1, Z2, Z3 of the method, the, in particular probabilistic, filtering or at least part of this, in particular probabilistic, filtering of these position hypotheses PH is carried out by means of the particular feature association filter MAF, which is formed in particular as a probabilistic filter, wherein in particular these feature association filters MAF are configured differently. In each feature association filter MAF, as already described above, in particular incorrect associations A between the sensor landmark objects SLM detected by the sensor and the map landmark objects KLM stored in the digital map are filtered out. In this way, different reliable position hypotheses SPH1, SPH2, SPH3 are ascertained in the different branches Z1, Z2, Z3 of the method. These reliable position hypotheses SPH1, SPH2, SPH3 and, advantageously, the inherent motion EM of the vehicle 1 ascertained, in particular, by means of the corresponding sensor system, in particular odometry sensor system, are processed in the probabilistic filter PF, for example in the Kalman filter. This probabilistic filter PF is advantageously configured here in the same way in all branches Z1, Z2, Z3 of the method. The result is therefore a probability distribution WV1, WV2, WV3 of the vehicle position in the digital map for each branch Z1, Z2, Z3 of the method. The corresponding guaranteed position area PL1, PL2, PL3 can then be ascertained from this.

As a result, a plurality of, in the example shown in FIG. 2 three, localization results LE1, LE2, LE3 with different accuracies and with different guaranteed position areas PL1, PL2, PL3, i.e., with different guaranteed maximum error rates, are ascertained. From the set of these localization results LE1, LE2, LE3, the most accurate localization result LE1, in this case the localization result LE1 of the upper branch Z1, the guaranteed position area PL1 of which lies within all wider guaranteed position areas PL2, PL3, is selected and output as the sought and ascertained vehicle position eFP.

In the improved second embodiment, the previously known first embodiment of the method explained with reference to FIG. 1 is thus carried out several times, in particular in a plurality of parallel branches Z1, Z2, Z3, as method section VA of the method, in the example shown in FIG. 2 three times, thus in three parallel branches Z1, Z2, Z3. The result is thus a plurality of, in the example shown three, localization results LE1, LE2, LE3 in the form of the probability distributions WV1, WV2, WV3 and a plurality of, in the example shown three, guaranteed position areas PL1, PL2, PL3 associated with each of these in the form of the corresponding box around the corresponding vehicle position.

In the example shown in FIG. 2, the most accurate localization result LE1 is achieved in the upper branch Z1 of the method, because the box representing the guaranteed position area PL1 is narrower than in the other branches Z2, Z3, and the probability distribution WV1 shows the lowest dispersion. However, the guaranteed maximum error rate is higher than in the other two branches Z2, Z3, i.e., the localization result LE1 is the least reliable.

In the lowest branch Z3, the most inaccurate localization result LE3 is achieved, because the box representing the guaranteed position area PL3 is wider than in the other two branches Z1, Z2, and the probability distribution WV3 shows the greatest dispersion. However, the guaranteed maximum error rate is lower than in the other two branches Z1, Z2, i.e., the most reliable localization result LE3 is achieved in the lower branch Z3.

Now it is checked whether, for each possible pair of the boxes, i.e., the guaranteed position areas PL1, PL2, PL3, i.e., for all possible pairings of these guaranteed position areas PL1, PL2, PL3 of the branches Z1, Z2, Z3, it holds that one of the boxes of the pair in question lies completely within the other box of the pair, i.e., that one of the guaranteed position areas PL1, PL2, PL3 of the pair in question lies completely within the other guaranteed position area PL1, PL2, PL3 of the pair. It is thus checked whether the boxes, i.e., the guaranteed position areas PL1, PL2, PL3, completely overlap in each pair.

If this is the case, the localization result LE1 associated with the narrowest box, i.e., the narrowest guaranteed position area PL1, is selected and output as the final localization result LE1. In the example shown here, this is the guaranteed position area PL1 of the upper branch Z1 and thus its localization result LE1. All boxes, i.e., all guaranteed position areas PL1, PL2, PL3, are also output.

The most accurate localization result LE1, here that of the upper branch Z1, and the guaranteed position areas PL1, PL2, PL3 applicable for different maximum error rates, in particular the position areas PL1, PL2, PL3 of all branches Z1, Z2, Z3, are thus output.

As a result, the most accurate localization result LE1 is selected from the three branches Z1, Z2, Z3, in the example shown the curve, i.e., the probability distribution WV1, from the upper branch Z1, and the less accurate localization results LE2, LE3 of the other two branches Z2, Z3 are replaced by the selected most accurate localization result LE1. Through this replacement, the most reliable localization, i.e., with the lowest maximum error rate, in the example shown here the box of the lower branch Z3, is obtained for the guaranteed position area PL3 with the most accurate localization result LE1, in this case of the upper branch Z1.

The first embodiment of the method shown in FIG. 1, which provides localization results LE either with high accuracy and low integrity, i.e., with low reliability and low maximum error rate, or with low accuracy and high integrity, is thus modified by the described solution, i.e., by the improved second embodiment of the method, in such a way that a high accuracy and at the same time a high integrity of the localization results LE1, LE2, LE3 is achieved.

If one of the boxes only partially overlaps with another of the boxes, i.e., if the guaranteed position areas PL1, PL2, PL3 of at least one pair only partially overlap, it is expedient to assume an error and then advantageously output an error message.

In this second embodiment of the method for landmark-based localization of a vehicle 1, in particular according to the invention, shown in FIG. 2, a plurality of position hypotheses PH for the vehicle position are thus formed in a method section VA based on the forming of associations A between the sensor landmark objects SLM detected by the sensor, in particular by means of the environment detection sensor system of the vehicle 1, and the map landmark objects KLM stored in the digital map, and, also in this method section VA, the most probable vehicle position is ascertained as the localization result LE based on the probabilistic filtering of the position hypotheses PH, and the guaranteed position area PL is ascertained, in which the specified upper error limit is not exceeded.

This process section VA is performed several times, for example at least twice, for example at least three times, for example exactly three times, with different set-ups of the probabilistic filtering, in particular in parallel, in particular temporally in parallel, in particular in parallel branches Z1, Z2, Z3 of the method. In other words, in this improved second embodiment of the method, in a plurality of, in particular parallel, in particular temporally parallel, branches Z1, Z2, Z3, for example in at least two or at least three or exactly three branches Z1, Z2, Z3, in each case a plurality of position hypotheses PH for the vehicle position are formed based on the forming of associations A between the sensor landmark objects detected by the sensor, in particular by means of the environment detection sensor system of the vehicle 1, and the map landmark objects KLM stored in the digital map and, based on the probabilistic filtering of the position hypotheses PH, the most probable vehicle position is ascertained as localization result LE1, LE2, LE3 and the guaranteed position area PL1, PL2, PL3 is ascertained, in which the predefined upper error limit is not exceeded, wherein the branches Z1, Z2, Z3 each have a different set-up of the probabilistic filtering.

This results in a plurality of localization results LE1, LE2, LE3 with different accuracies and different guaranteed position areas PL1, PL2, PL3. If the guaranteed position areas PL1, PL2, PL3 fully overlap in pairs, i.e., in particular if this is the case for every possible pairing of the guaranteed position areas PL1, PL2, PL3 ascertained in the various embodiments of this method step VA, then the localization result LE1 with the smallest guaranteed position area PL1, in this case that of the upper branch Z1, is selected as the vehicle position eFP, i.e. as the vehicle position eFP sought and to be ascertained by means of the method.

The selected vehicle position eFP is advantageously assigned to all larger guaranteed position areas PL2, PL3.

If there is at least one pair of guaranteed position areas PL1, PL2, PL3 that only partially overlap, i.e., if the guaranteed position areas PL1, PL2, PL3 do not all fully overlap in pairs, an error message is advantageously output.

With reference to FIG. 2, this method will now be explained in detail again, in particular for the exemplary embodiment of the method with three branches Z1, Z2, Z3 shown here.

A plurality of position hypotheses PH for the vehicle position are formed based on the forming of associations A between the sensor landmark objects SLM detected by the sensor, in particular by means of the environment detection sensor system of the vehicle 1, and the map landmark objects KLM stored in the digital map. This can already be performed, for example, in parallel in the plurality of branches Z1, Z2, Z3, here in the three branches Z1, Z2, Z3, of the method, wherein this then leads to the same position hypotheses PH. Therefore, this can alternatively also be performed jointly, as in the example shown here, and the position hypotheses PH determined in this way are then used for the plurality of, in particular parallel, branches Z1, Z2, Z3 of the method, in the example shown here for the three branches Z1, Z2, Z3. In other words, either the entire method section VA of the method up to the end of the plurality of branches Z1, Z2, Z3 is executed accordingly with different set-ups of the probabilistic filtering, or at least the part VT of this method section VA with the method steps shown in the branches Z1, Z2, Z3, after the ascertainment of the position hypotheses PH up to the end of the branches Z1, Z2, Z3, is executed accordingly with different set-ups of the probabilistic filtering.

The ascertained position hypotheses PH are then probabilistically filtered in each of the branches Z1, Z2, Z3 with different set-ups of the probabilistic filtering in the manner described above. In each branch Z1, Z2, Z3 of the method, the, in particular probabilistic, filtering or at least part of this, in particular probabilistic, filtering of these position hypotheses PH is carried out by means of the corresponding feature association filter MAF1, MAF2, MAF3, which is formed in particular as a probabilistic filter, wherein in particular these feature association filters MAF1, MAF2, MAF3 are configured differently. However, they can work together synergistically, i.e., they do not have to be completely independent of each other, for example, but can share one or more initial processing steps with each other.

In each feature association filter MAF1, MAF2, MAF3, as already described above, false associations A between the sensor landmark objects SLM detected by sensor and the map landmark objects KLM stored in the digital map are filtered out. In this way, different reliable position hypotheses SPH1, SPH2, SPH3 are ascertained in each of the different branches Z1, Z2, Z3 of the method, in the example shown in the upper branch Z1 many reliable position hypotheses SPH1, in particular more than in the other two branches Z2, Z3, although they are less reliable than in the other two branches Z2, Z3, in the lower branch Z3 very few reliable position hypotheses SPH3, in particular less than in the other two branches Z1, Z2, although they are very reliable, in particular more reliable than in the other two branches Z1, Z2, and in the middle branch Z2, a number of reliable position hypotheses SPH2 that is less than in the upper branch Z1 and greater than in the lower branch Z3, these reliable position hypotheses SPH2 of the middle branch Z2 being more reliable than the reliable position hypotheses SPH1 of the upper branch Z1 and less reliable than the reliable position hypotheses SPH3 of the lower branch Z3.

These reliable position hypotheses SPH1, SPH2, SPH3 and, advantageously, the inherent motion EM of the vehicle 1 ascertained, in particular by means of the corresponding sensor system, in particular odometry sensor system, are processed in the probabilistic filter PF, for example in the Kalman filter. This probabilistic filter PF is advantageously configured in the same way in all branches Z1, Z2, Z3 of the method. The result is therefore a separate localization result LE1, LE2, LE3 for each branch Z1, Z2, Z3 of the method, i.e., a probability distribution WV1, WV2, WV3 of the vehicle position in the digital map and a corresponding guaranteed position area PL1, PL2, PL3.

Due to the different configuration of the probabilistic filtering, in particular the feature association filters MAF1, MAF2 MAF3 and the resulting different reliable position hypotheses SPH1, SPH2, SPH3, this results in different localization results LE1, LE2, LE3, i.e., different probability distributions WV1, WV2, WV3 of the vehicle position in the digital map and thus different accuracies with regard to the vehicle position, as well as different guaranteed position areas PL1, PL2, PL3. In the example shown, in the upper branch Z1 the probabilities for the vehicle position are close together, so that there is a high accuracy with regard to the vehicle position, but with a low integrity, in the middle branch Z2 they are more strongly distributed, so that the accuracy with regard to the vehicle position is lower here, but with a somewhat higher integrity, and in the lower branch Z3 they are even more strongly distributed, so that here there is the lowest accuracy with regard to the vehicle position, but with the highest integrity. The guaranteed position area PL1, PL2, PL3 is narrow in the upper branch Z1, wider in the middle branch Z2 and even wider in the lower branch Z3.

These localization results LE1, LE2, LE3 are now fed to a reference position selector RPS, which, if the guaranteed position areas PL1, PL2, PL3 fully overlap in pairs, as is the case in the example shown, selects the localization result LE1 with the smallest guaranteed position area PL1, in the example shown the localization result LE1 of the upper branch Z1, as the vehicle position eFP, i.e., as the sought vehicle position eFP to be ascertained by means of the method. i.e., as the sought vehicle position eFP to be ascertained by means of the method, because this is the best ascertained vehicle position within all guaranteed position areas PL1, PL2, PL3 of the branches Z1, Z2, Z3, and in addition this selected vehicle position eFP is also assigned to all larger guaranteed position areas PL2, PL3, i.e., also to the guaranteed position areas PL2, PL3 from the other branches Z2, Z3.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for landmark-based localization of a vehicle, the method comprising:
    receiving, by an autonomous driving system of the vehicle, a determined current vehicle position; and
    controlling the vehicle by the autonomous driving system so long as the determined current vehicle position has an integrity that is below an alert limit threshold value for the autonomous driving system of the vehicle,
    wherein the current vehicle position is determined by
    a) forming, by the vehicle, a plurality of position hypotheses for a vehicle position based on associations formed between sensor landmark objects detected by a sensor of the vehicle and map landmark objects stored in a digital map;
    b) probabilistically filtering, by the vehicle, the plurality of position hypotheses to produce a probability distribution of the vehicle position in the digital map;
    c) determining, by the vehicle, a most likely vehicle position as a localization result based on probability distribution of the vehicle position in the digital map, and determining a guaranteed position area, in which a predefined error upper limit is not exceeded,
    wherein steps a)-c) are performed several times with different configurations of the probabilistic filtering so that there are several localization results, wherein the different configurations of the probabilistic filtering relate to stringency of the configuration for discarding improbable position hypotheses, and
    wherein one localization result of the several localization results from performing the steps a)-c) several times is selected as the determined current vehicle position if the guaranteed position areas from performing the steps a)-c) several times overlap fully in pairs, wherein the one localization result has a smallest guaranteed position area of the determined guaranteed position areas.

2. The method of claim 1, wherein the different configurations of the probabilistic filtering relate to a feature association filter, in which the plurality of position hypotheses are filtered and the improbable position hypotheses are discarded.

3. The method of claim 1, further comprising:
    outputting an error message if at least one pair of the guaranteed position areas from performing the steps a)-c) several times overlap only in part.

4. The method of claim 1, wherein the selected vehicle position (eFP) is assigned to all larger guaranteed position areas from performing the steps a)-c) several times.

5. The method of claim 1, wherein the steps a)-c) are performed at least three times.

6. The method of claim 1, wherein the performing of the steps a)-c) several times with different configurations of the probabilistic filtering is performed in a plurality of parallel branches of the method.

7. The method of claim 6, wherein each of the plurality of parallel branches comprise a feature association filter, wherein the feature association filters of the plurality of parallel branches are configured differently, and wherein reliable position hypotheses is determined based on the feature association filters of the plurality of parallel branches.

8. The method of claim 7, wherein, in each of the plurality of parallel branches, the reliable position hypothesis of the branch and an inherent movement of the vehicle are processed by a Kalman filter, and thus a corresponding localization result of each of the plurality of branches and a corresponding guaranteed position area of each of the plurality of branches, in which the predefined error upper limit is not exceeded, are determined.

9. The method of claim 1, wherein sensor landmark objects already passed by the vehicle are used for the forming of the associations between the sensor landmark objects detected by sensor and the map landmark objects stored in the digital map.

10. The method of claim 1, wherein the sensor landmark objects detected by the sensor over a predefined time period or over a predefined route length are used for the forming of the associations between the sensor landmark objects detected by sensor and the map landmark objects stored in the digital map.

* * * * *